United States Patent
Xu et al.

(10) Patent No.: US 10,467,768 B2
(45) Date of Patent: Nov. 5, 2019

(54) OPTICAL FLOW ESTIMATION USING 4-DIMENSIONAL COST VOLUME PROCESSING

(71) Applicant: INTEL CORPORATION, Santa Clara, CA (US)

(72) Inventors: Jia Xu, Santa Clara, CA (US); René Ranftl, Santa Clara, CA (US); Vladlen Koltun, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 189 days.

(21) Appl. No.: 15/482,270

(22) Filed: Apr. 7, 2017

(65) Prior Publication Data

US 2018/0293454 A1     Oct. 11, 2018

(51) Int. Cl.
| | |
|---|---|
| *G06K 9/46* | (2006.01) |
| *G06T 7/60* | (2017.01) |
| *G06K 9/00* | (2006.01) |
| *G06K 9/62* | (2006.01) |
| *G06T 7/246* | (2017.01) |

(52) U.S. Cl.
CPC ............ *G06T 7/60* (2013.01); *G06K 9/00765* (2013.01); *G06K 9/4628* (2013.01); *G06K 9/627* (2013.01); *G06T 7/248* (2017.01); *G06T 2207/20081* (2013.01)

(58) Field of Classification Search
CPC ... G06T 2207/30241; G06T 7/20; G06T 7/73; G06T 7/174; G06T 7/33; G06K 9/481; H04N 5/144; H04N 19/513
See application file for complete search history.

(56) References Cited

U.S. PATENT DOCUMENTS

| | | | | |
|---|---|---|---|---|
| 5,933,823 A | * | 8/1999 | Cullen | G06K 9/00442 |
| 6,516,099 B1 | * | 2/2003 | Davison | G06T 7/33 |
| | | | | 382/284 |
| 8,774,499 B2 | * | 7/2014 | Wang | G06K 9/00335 |
| | | | | 382/159 |

(Continued)

OTHER PUBLICATIONS

Multimodal matching by maximization of mutual—Technique, Georges Palos et al., IEEE, 0-7803-8439-3, 2004, pp. 1679-1682 (Year: 2004).*

(Continued)

*Primary Examiner* — Jayesh A Patel
(74) *Attorney, Agent, or Firm* — Finch & Malone PLLC

(57) ABSTRACT

Techniques are provided for estimation of optical flow between images using 4-dimensional cost volume processing. A methodology implementing the techniques according to an embodiment includes extracting a first set of feature vectors from a first image and extracting a second set of feature vectors from a second image. Each feature vector of the first set is associated with a pixel of the first image and each feature vector of the second set is associated with a pixel of the second image. The method further includes constructing a 4-dimensional (4D) cost volume to store a distance metric between each feature vector of the first set of feature vectors and a selected subset of feature vectors of the second set of feature vectors. The method further includes performing a flow-semi-global matching (Flow-SGM) on the 4D cost volume to estimate an optical flow vector for pixels of the first image.

25 Claims, 7 Drawing Sheets

(56) References Cited

U.S. PATENT DOCUMENTS

| | | | |
|---|---|---|---|
| 9,349,193 B2* | 5/2016 | Chen | G06T 7/194 |
| 9,460,363 B2* | 10/2016 | Zhang | G06K 9/4604 |
| 10,078,904 B2* | 9/2018 | Forchheimer | G06T 7/246 |
| 2003/0058945 A1* | 3/2003 | Chiba | G06T 7/33 375/240.16 |
| 2004/0010497 A1* | 1/2004 | Bradley | G06K 9/6223 |
| 2004/0076313 A1* | 4/2004 | Bronstein | G06K 9/00214 382/118 |
| 2006/0033701 A1* | 2/2006 | Wilson | G06F 1/1616 345/156 |
| 2007/0124024 A1* | 5/2007 | Okamoto | B25J 5/007 700/245 |
| 2008/0037877 A1* | 2/2008 | Jia | G06F 16/583 382/224 |
| 2008/0278584 A1* | 11/2008 | Shih | G06T 7/215 348/169 |
| 2015/0366487 A1* | 12/2015 | Ryabov | A61B 5/1171 348/77 |
| 2016/0232428 A1* | 8/2016 | Engstrom | G06F 16/51 |
| 2016/0275377 A1* | 9/2016 | Mathew | G06K 9/6282 |

OTHER PUBLICATIONS

Four-dimensional deformable image registration—modeling, Edward Castillo et al., Phys.Med.Biol 55305, 2010, pp. 305-327 (Year: 2010).*

Bai, Min, et al., "Exploiting Semantic Information and Deep Matching for Optical Flow", European Conference on Computer Vision, 2016, 16 pages, (published before this application Apr. 2017).

Bailer, Christian, et al., "Flow Fields: Dense Correspondence Fields for Highly Accurate Large Displacement Optical Flow Estimation", ICCV, 2015, 9 pages, (published before this application Apr. 2017).

Baker, Simon, et al., "A Database and Evaluation Methodology for Optical Flow", ICCV, 2007, 8 pages, (published before this application Apr. 2017).

Brox, Thomas, and Jitendra Malik, "Large Displacement Optical Flow: Descriptor Matching in Variational Motion Estimation", IEEE Transactions on Pattern Analysis and Machine Intelligence, 2010, 14 pages, (published before this application Apr. 2017).

Chen, Qifeng and Vladlen Kotlun, "Full Flow: Optical Flow Estimation by Global Optimization over Regular Grids", CVPR, 2016, 9 pages, (published before this application Apr. 2017).

Gadot, David and Lior Wolf, "PatchBatch: a Batch Augmented Loss for Optical Flow", CVPR, 2016, 10 pages, (published before this application Apr. 2017).

Guney, Fatma and Andreas Geiger, "Deep Discrete Flow", ACCV, 2016, 17 pages, (published before this application Apr. 2017).

Hirschmuller, Heiko and Daniel Scharstein, "Evaluation of Stereo Matching Costs on Images with Radiometric Differences", IEEE Transactions on Pattern Analysis and Machine Intelligence, 2008, 17 pages, (published before this application Apr. 2017).

Hu, Yinlin, et al., "Efficient Coarse-to-Fine PatchMatch for Large Displacement Optical Flow", CVPR, 2016, 9 pages, (published before this application Apr. 2017).

Hur, Junhwa and Stefan Roth, "Joint Optical Flow and Temporally Consistent Semantic Segmentation", ECCV Workshops, 2016, 14 pages, (published before this application Apr. 2017).

Li, Yu, et al., "SPM-BP: Sped-up PatchMatch Belief Propagation for Continuous MRFs", ICCV, 2015, 9 pages, (published before this application Apr. 2017).

Luo, Wenjie, et al., "Efficient Deep Learning for Stereo Matching", CVPR, 2016, 9 pages, (published before this application Apr. 2017).

Menze, Moritz, et al., "Discrete Optimization for Optical Flow", GCPR, 2015, 12 pages, (published before this application Apr. 2017).

Revaud, Jerome, et al., "EpicFlow: Edge-Preserving Interpolation of Correspondences for Optical Flow", CVPR, 2015, 9 pages, (published before this application Apr. 2017).

Revaud, Jerome, et al., "DeepMatching: Hierarchical Deformable Dense Matching", IJCV, 2016, 22 pages, (published before this application Apr. 2017).

Sevilla-Lara, Laura, et al., "Optical Flow with Semantic Segmentation and Localized Layers", CVPR, 2016, 10 pages, (published before this application Apr. 2017).

Sun, Deqing, et al., "A Quantitative Analysis of Current Practices in Optical Flow Estimation and the Principles Behind Them", International Journal of Computer Vision, Jan. 2014, vol. 106, 23 pages, (published before this application Apr. 2017).

Vogel, Christoph, et al., "An Evaluation of Data Costs for Optical Flow", GCPR, 2013, 10 pages, (published before this application Apr. 2017).

Zbontar, Jure and Yann Lecun, "Stereo Matching by Training a Convolutional Neural Network to Compare Image Patches", JMLR, 2016, 32 pages, (published before this application Apr. 2017).

* cited by examiner

OPTICAL FLOW ESTIMATION USING 4-DIMENSIONAL COST VOLUME PROCESSING

BACKGROUND

Optical flow estimation generally provides a mapping between the pixels of two or more images, for example to identify motion of objects in sequential image frames received from a video camera. This can be useful in computer vision and robotics systems. Existing optical flow estimation systems typically employ nearest neighbor searching and coarse-to-fine analysis techniques. These systems, however, can be computationally intensive and can sometimes produce unacceptable results, particularly when there are large displacements (e.g., motion) between image frames, texture-less regions in the images, and/or motion blur.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for optical flow estimation that provides a mapping between the pixels of two or more images. The generated mapping is in the form of a vector field, where each vector describes the motion of an associated pixel over the elapsed time between sequential image frames. The techniques allow for improved optical flow estimation accuracy by constructing and employing a full four-dimensional (4D) cost volume, as will be explained below. The techniques also allow for exploitation of parallel processing capabilities and other calculation efficiencies, to provide improved computational performance, as will also be described in greater detail below. The resulting estimated optical flow field may be used for a variety of applications including video segmentation, motion detection, object tracking, action recognition, and autonomous driving.

The disclosed techniques can be implemented, for example, in a computing system or a software product executable or otherwise controllable by such systems, although other embodiments will be apparent. The system or product is configured to provide estimation of optical flow between two or more images using 4-dimensional cost volume processing. In accordance with an embodiment, a methodology to implement these techniques includes extracting a first set of feature vectors from a first image and extracting a second set of feature vectors from a second image. Each feature vector of the first set is associated with a pixel of the first image and each feature vector of the second set is associated with a pixel of the second image. The method also includes constructing a 4-dimensional (4D) cost volume to store a distance metric between each feature vector of the first set of feature vectors and a selected subset of feature vectors of the second set of feature vectors. The method further includes performing a flow-semi-global matching (Flow-SGM) on the 4D cost volume to estimate an optical flow vector for pixels of the first image and to generate an estimated optical flow field from the estimated optical flow vectors.

As will be appreciated, the techniques described herein may allow for improved optical flow estimation, compared to existing methods that rely on nearest neighbor searching and coarse-to-fine analysis techniques. The disclosed techniques can be implemented on a broad range of platforms including laptops, tablets, smart phones, workstations, and imaging devices. These techniques may further be implemented in hardware or software or a combination thereof.

Figure 1:
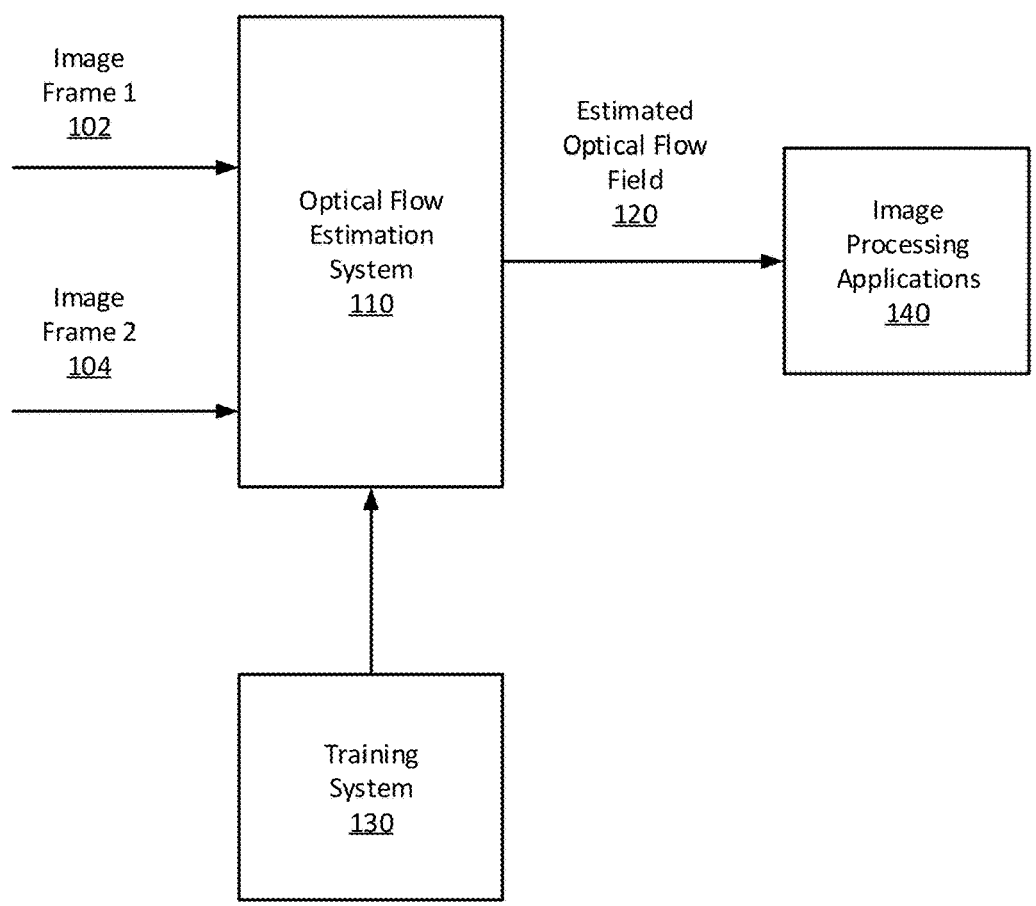
FIG. 1 is a top-level block diagram of an implementation of an optical flow estimation system, configured in accordance with certain embodiments of the present disclosure.

FIG. 1 is a top-level block diagram of an image processing apparatus 100, configured to implement of an optical flow estimation system in accordance with certain embodiments of the present disclosure. An optical flow estimation system 110 is shown as being configured to receive two image frames, 102 and 104, and to generate an estimated optical flow field 120. The image frames may be provided by any suitable imaging source including, for example, a camera, a video camera, a scanner, or a database of images. The image frames 102, 104 will typically capture a scene at sequential moments in time where some portions of the scene (e.g., people, objects, and/or background) are in motion over the time period between frames. The estimated optical flow field 120 comprises a set of vectors that describe the motion of pixels between the first and second image frame. The optical flow estimation system 110 includes a convolutional neural network (CNN) configured to perform feature extraction on the images, as will be explained in greater detail below, and the training system 130 is configured to train the CNN, as will also be explained below.

Although only two image frames are shown, it will be appreciated that the optical flow estimation system 110 may operate on any number of pairs of image frames to produce any desired number of estimated optical flow fields 120. The resulting fields 120 may then be provided to one or more image processing applications 140 such as, for example, a video segmentation application, a motion detection application, an object tracking application, an action recognition application, an autonomous driving system, and a computer vision application.

Figure 2:
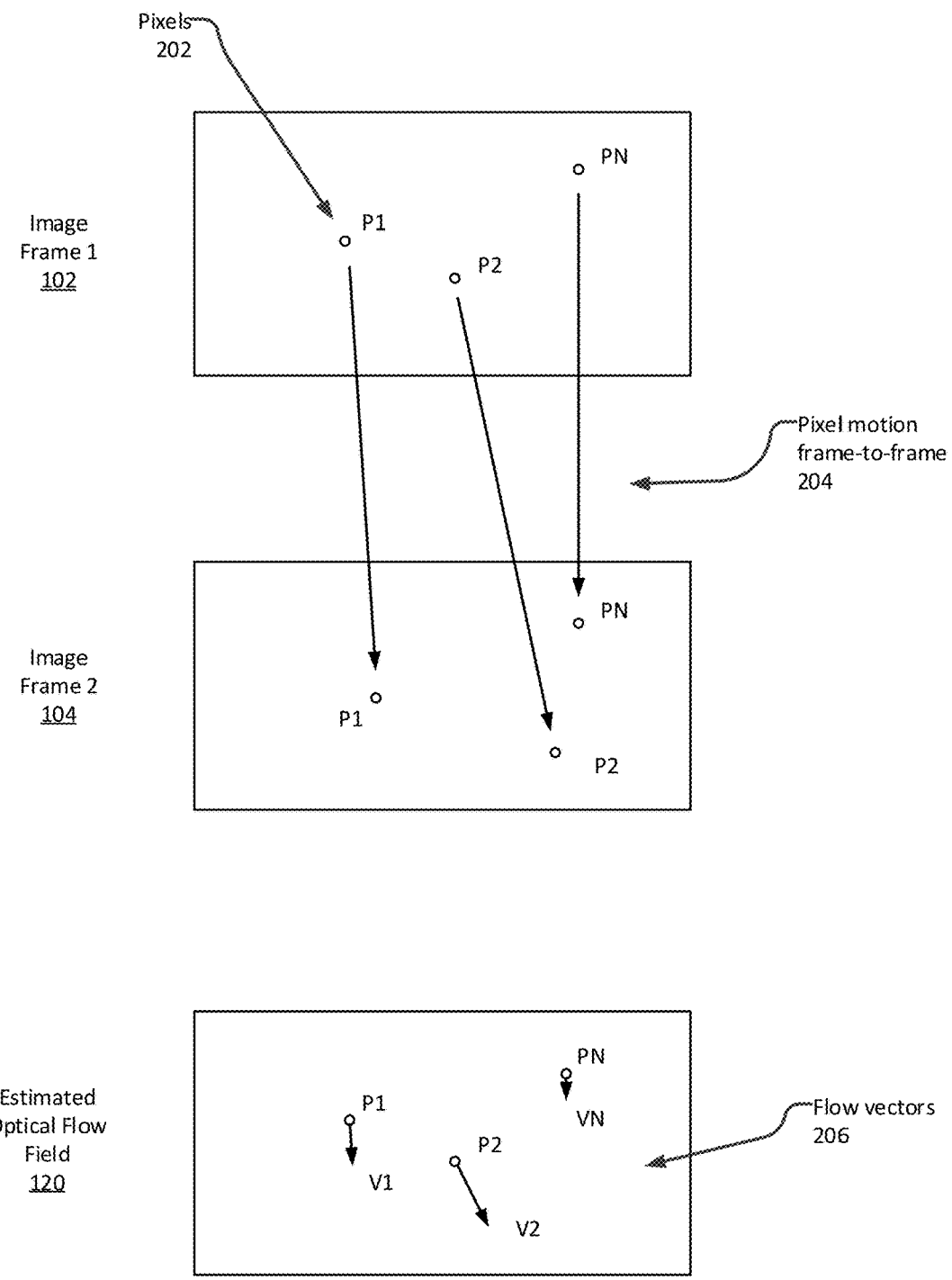
FIG. 2 illustrates an estimated optical flow field, in accordance with certain embodiments of the present disclosure.

FIG. 2 illustrates an estimated optical flow field 120, in accordance with certain embodiments of the present disclosure. Image frame 1 102 and image frame 2 104 are shown to include pixels 202 labeled P1, P2, . . . PN. Only three pixels are shown, for simplicity of illustration, but it will be understood that the image frames generally comprise large numbers of pixels, for example on the order of millions of pixels or more. Image frame 2 104 captures a representation of a scene at a point in time subsequent to that of image frame 1 102. As such, some portions of the image may move and this is shown by arrows 204 representing pixel motion from frame to frame. The estimated optical flow field 120 is also shown with flow vectors V1, V2, . . . VN 206 attached to each of the pixels P1, P2, . . . PN 202.

Figure 3:
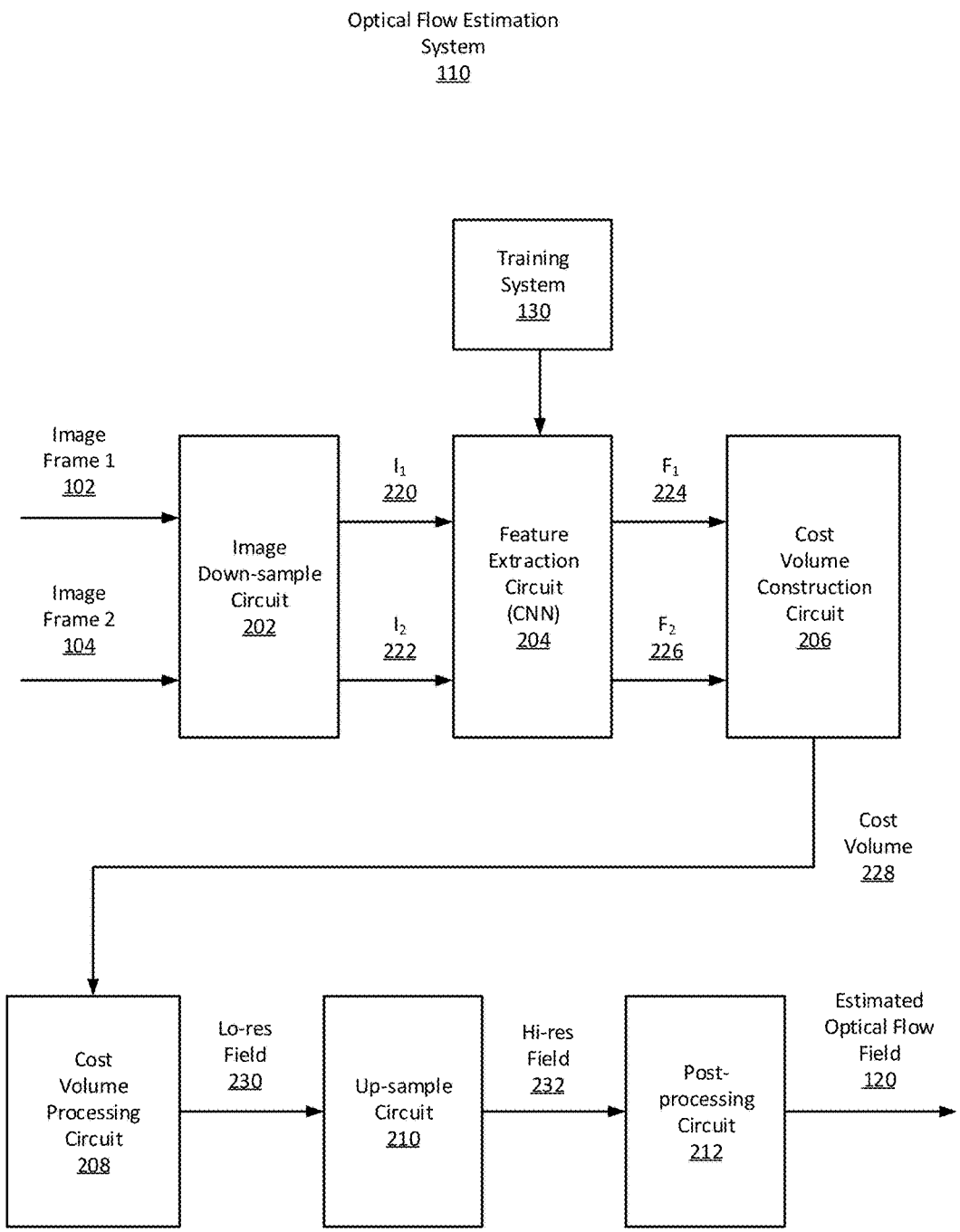
FIG. 3 is a more detailed block diagram of an optical flow estimation system, configured in accordance with certain embodiments of the present disclosure.

FIG. 3 is a more detailed block diagram of an optical flow estimation system 110, configured in accordance with certain embodiments of the present disclosure. The system 110 is shown to include an image down-sampling circuit 202, a feature extraction circuit 204 including a convolutional neural network (CNN), a cost volume construction circuit 206, a cost volume processing circuit 208, an up-sampling circuit 210, and a post processing circuit 212. A training system 130 for the CNN of the feature extraction circuit 204 is also shown, the operation of which is described in greater detail below in connection with FIG. 4.

The image down-sampling circuit 202 is configured to down-sample a first received image frame 102 and a second received image frame 104, from an original resolution (X×Y) to a selected lower resolution (M×N). In some embodiments, the selected lower resolution may be on the order of one third of the original resolution (e.g., M=X/3, N=Y/3). The degree of down-sampling may be adjusted based on computational requirements and accuracy requirements.

The feature extraction circuit 204 is configured to extract a first set of feature vectors $F_1$ 224 from the first down-sampled image $I_1$ 220, and to extract a second set of feature vectors $F_2$ 226 from the second down-sampled image $I_2$ 222. Each feature vector of the first set $F_1$ is associated with a pixel of the first down-sampled image $I_1$ and each feature vector of the second set $F_2$ is associated with a pixel of the second down-sampled image $I_2$.

In some embodiments, the feature extraction is performed by a convolutional neural network (CNN), the training of which is described below in connection with FIG. 5. In some embodiments, the CNN may be configured with four convolutional layers, wherein the first three layers employ 64 filters of size 3×3 and the last layer employs d filters, where d is the dimensionality of the feature vectors which is chosen as a trade-off between expressive power and computational cost. In some embodiments, the chosen dimensionality d may be 64, 32, 16, or 10, which values have been found to produce positive results in experimental testing. The use of a relatively small dimensionality d may contribute to the computational efficiency of the disclosed techniques, compared to traditional image processing techniques that typically use 1024 or more features. Additionally, the CNN may be configured with a relatively small receptive field of, for example, on the order of 9×9 pixels, which corresponds to an induced receptive field in the original image of 27×27 pixels (for a down-sampling factor of 3). The use of a small receptive field may further contribute to the computational efficiency of the disclosed techniques.

Figure 4:
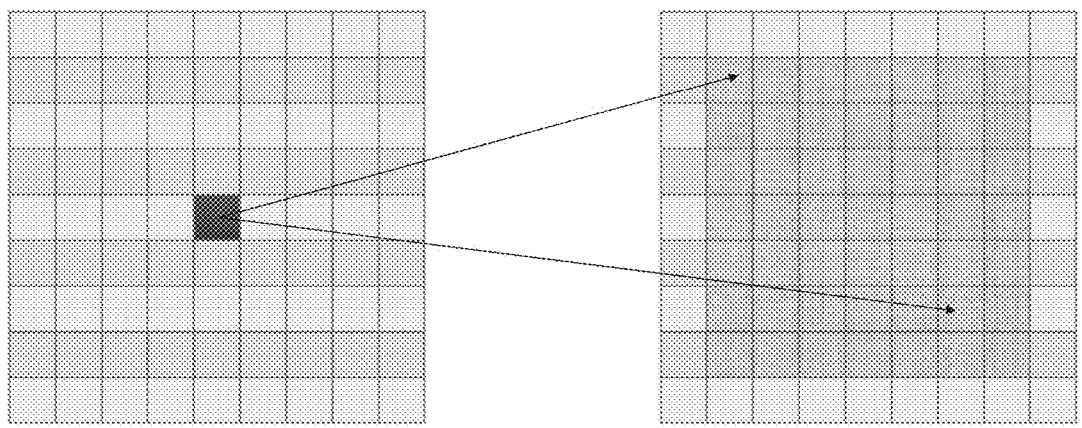
FIG. 4 illustrates a 4D cost volume, in accordance with certain embodiments of the present disclosure.

The cost volume construction circuit 206 is configured to construct a 4D cost volume 228 to store a distance metric between each feature vector of the first set (M×N) of feature vectors $F_1$ and a selected subset (R×R) of feature vectors of the second set of feature vectors $F_2$. The size of the selected subset, R, is chosen to represent the maximum displacement of pixels (from frame to frame) that needs to be considered. The 4D cost volume 228 is illustrated in FIG. 4.

The cost volume construction circuit 206 is further configured to normalize the extracted feature vectors, of the cost volume 228, to unity length, and calculate the distance metric as a Euclidean distance using a vector dot product operation applied to the normalized extracted feature vectors. In some embodiments, the cost volume construction circuit is further configured to rescale and bin the distance metrics of the 4D cost volume to a selected integer range, such as, for example eight bits. The use of a vector dot product, and the bit range restriction (e.g., allowing for fixed point arithmetic), improves the computational efficiency of the disclosed techniques. Additionally, parallel processing techniques (e.g., using parallel processors and/or parallel threads) may be exploited to further improve computational efficiency, particularly since the regularity of the data in the feature vector spaces and the cost volume lends itself to parallel processing.

The cost volume processing circuit 208 is configured to perform a flow-semi-global matching (Flow-SGM) on the 4D cost volume to estimate an optical flow vector for pixels of the first image and to generate a low-resolution estimated optical flow field 230 comprising the estimated optical flow vectors. The Flow-SGM algorithm operates as follows.

A set of spatial neighbors of pixel p is denoted as N(p). The flow vector for pixel p is denoted as $V_p$. The discrete energy of the optical flow field V of all pixels is defined as:

$$E(V) = \sum_p \left( \sum_{q \in N(p)} P_1 [\|V_p - V_q\|_1 = 1] + \sum_{q \in N(p)} P_2^{p,q} [\|V_p - V_q\|_1 > 1] + C(p, V_p) \right)$$

where C is the cost volume entry for pixel p and flow vector $V_p$, [·] denotes the Iverson bracket, and $P_1$ and $P_2^{p,q}$ are regularization parameters. $P_1$ is set to a chosen fixed constant value and $P_2^{p,q}$ is set as:

$$P_2^{p,q} = \begin{cases} \dfrac{P_2}{Q}, & \text{if } \|I_p^1 - I_q^1\| \geq T, \\ \text{else,} & P_2 \end{cases}$$

where the threshold T and the constants $P_2$ and Q are used to support edge-aware smoothing of the cost volume. Flow-SGM minimizes the energy E(V) by breaking the energy into independent paths, which can be globally minimized using dynamic programming. For each path a cost $L_r$ is computed as:

$$L_r(p, V_p) = C(p, V_p) + S(p, V_p) - \min_i (L_r(p - r, i) + P_2^{p, p-r})$$

where the contribution of the smoothness penalty $S(p, V_p)$ is recursively computed as:

$$S(p, V_p) = \min \{ L_r(p - r, V_p), \\ \min_{\hat{v} \in N(V_p)} (L_r(p - r, \hat{v}) + P_1, \\ \min_i (L_r(p - r, i) + P_2^{p, p-r}) \}$$

where r denotes the direction of traversal of the path. The computation of the penalty for switching by one discretization step is computed over a two-dimensional neighborhood. Multiple path directions r may be used and the corresponding costs $L_r(p, V_p)$ are accumulated into a filtered cost volume $L(p, V_p)$. In some embodiments, four cardinal path directions (two horizontal and two vertical) may be used. The final optical flow estimate is obtained by choosing the flow corresponding to the smallest cost in the filtered cost volume for each pixel. The flow may be computed in both directions and used as a consistency check to prune occluded or otherwise unreliable matches.

The up-sampling circuit 210 is configured to up-sample the low-resolution estimated optical flow field 210 back to the original resolution (or any desired higher resolution) using interpolation. In some embodiments, interpolation may be performed using Edge-preserving Interpolation of Correspondences for Optical Flow (EpicFlow).

The post processing circuit 212 is configured to in-fill occluded regions of the up-sampled high-resolution estimated optical flow field 232. The in-filling is based on extrapolation performed within homography fitted segments of the high-resolution estimated optical flow field 232. This technique makes use of the fact that large segments of optical flow fields can generally be characterized by planar homographies.

In some embodiments, the extent of the planar regions is identified based on a segmentation hierarchy combined with a bottom-up fitting strategy. An Ultrametric Contour Map (UCM) is computed using a suitable fast boundary detector. Thresholding of the map at different levels exploits a property of the UCM that induces a segmentation hierarchy. A two-level hierarchy may be created by thresholding the UCM at levels $t_1$ and $t_2$, where $t_2$ is greater than $t_1$. Homographies may then be fitted to the semi-dense matches belonging to segments in the finer level of the hierarchy. The fitting of segments may be performed using Random Sample Consensus (RANSAC). The homography is considered to be a valid explanation for the flow in the segment if its inlier set is sufficiently large. Larger segments may then be further aggregated by considering segments at the coarse level to be candidates for homography inpainting if the number of inliers in their children are sufficiently large. For each such higher-level segment, a homography is fitted and considered valid if enough inliers are found. For each segment with a valid homography, the homography is used to extrapolate the optical flow within the segment. All other segments are in painted, for example using EpicFlow. This technique has the advantage of not relying on semantic information, but rather using low-level edge cues, which generally broadens the applicability of the technique and enhances the synthesized flow field in the presence of large occluded regions.

FIG. 4 illustrates a 4D cost volume 402, in accordance with certain embodiments of the present disclosure. The 4D cost volume 402 is shown to be of dimension M×N×R×R, as described previously, to store the distance metrics between each of the feature vectors in $F_1$ and the selected subset of feature vectors in $F_2$.

Figure 5:
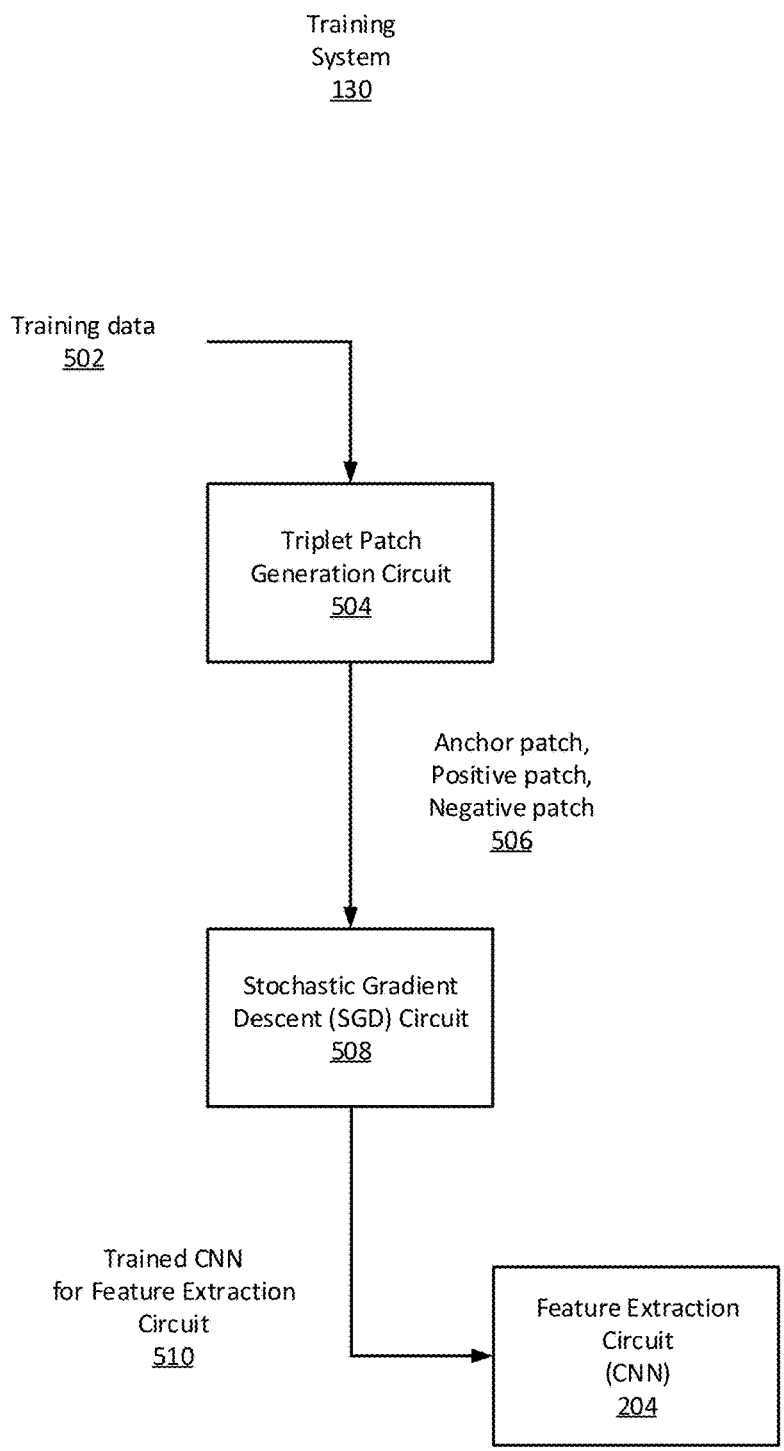
FIG. 5 is a block diagram of a training system for the convolutional neural network, configured in accordance with certain embodiments of the present disclosure.

FIG. 5 is a block diagram of a training system 130 for the convolutional neural network, configured in accordance with certain embodiments of the present disclosure. The training system 130 is shown to include a triplet patch generation circuit 504 and a stochastic gradient descent (SGD) circuit 508.

The triplet patch generation circuit 504 is configured to receive training data 502 which includes pairs of images and ground truth data representing known optical flow between the image pairs. For each image pair, the triplet patch generation circuit 504 randomly samples an anchor patch $x^a$ from the first image and uses the ground truth optical flow to generate a corresponding positive patch $x^p$ in the second image. A negative patch $x^n$ is also generated by randomly sampling a patch in the second image at a distance of between one and five pixels from the center of the positive patch $x^p$. Thus, the anchor patch is known to be more similar to the positive patch than to the negative patch. A training triplet is formed as $\{x^a, x^p, x^n\}$ and the process is repeated to generate large numbers (e.g., millions to hundreds of millions) of training triplets 506.

The stochastic gradient descent (SGD) circuit 508 is configured to generate a trained CNN for feature extraction 510 using a stochastic gradient descent algorithm applied to the generated training triplets. In some embodiments, other known training techniques may be used in light of the present disclosure. Additional computational efficiency may be achieved by performing the triplet patch generation in parallel with the SGD calculations, once the SGD pipeline has been primed with training triplets.

Methodology

Figure 6:
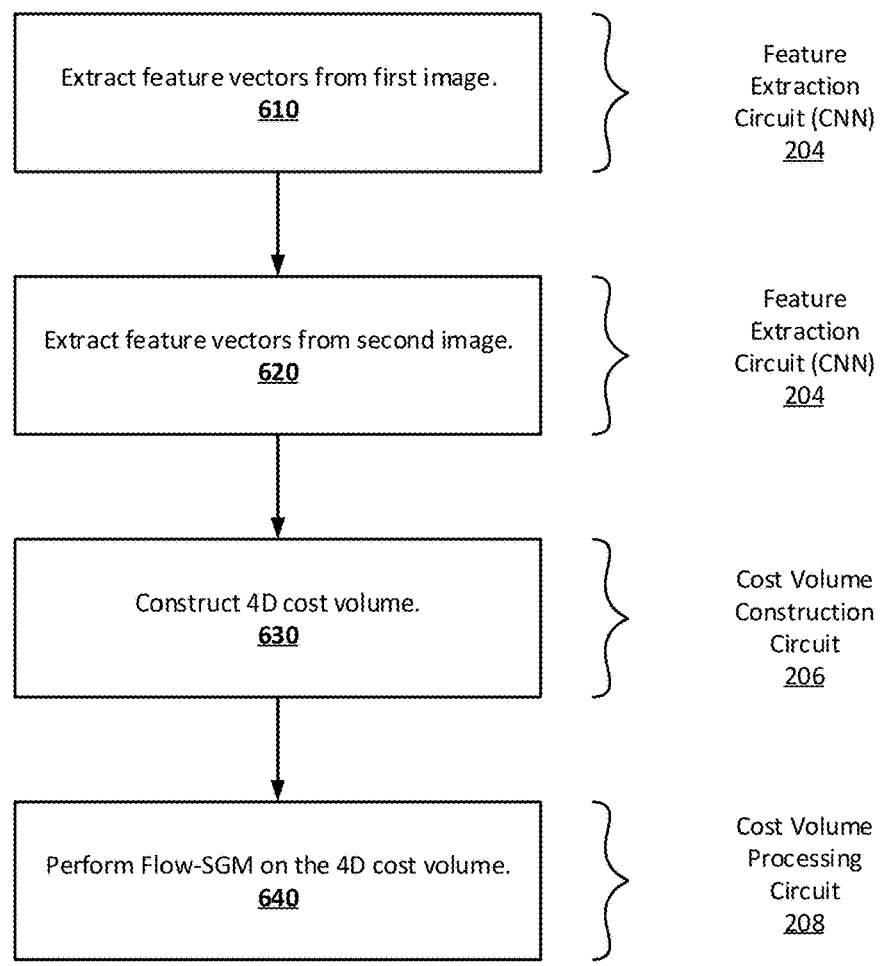
FIG. 6 is a flowchart illustrating a methodology for optical flow estimation, in accordance with certain embodiments of the present disclosure.

FIG. 6 is a flowchart illustrating a methodology 600 for optical flow estimation, in accordance with certain embodiments of the present disclosure. As can be seen, the example methods include a number of phases and sub-processes, the sequence of which may vary from one embodiment to another. However, when considered in the aggregate, these phases and sub-processes form a process for optical flow estimation in accordance with certain of the embodiments disclosed herein. These embodiments can be implemented, for example using the system architecture illustrated in FIGS. 1, 3, and 4 as described above. However other system architectures can be used in other embodiments, as will be apparent in light of this disclosure. To this end, the correlation of the various functions shown in FIG. 6 to the specific components illustrated in the other figures are not intended to imply any structural and/or use limitations. Rather, other embodiments may include, for example, varying degrees of integration wherein multiple functionalities are effectively performed by one system. For example, in an alternative embodiment a single module can be used to perform all of the functions of method 600. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in an embodiment, method 600 for optical flow estimation commences by extracting, at operation 610, a first set of feature vectors from a first image. Each feature vector of the first set is associated with a pixel of the first image. Next, at operation 620, a second set of feature vectors is extracted from a second image. Each feature vector of the second set associated with a pixel of the second image.

At operation 630, a 4-dimensional (4D) cost volume is constructed to store a distance metric between each feature vector of the first set of feature vectors and a selected subset of feature vectors of the second set of feature vectors. In some embodiments, the extracted feature vectors are normalized to unity length, and the distance metric is calculated as a Euclidean distance using a vector dot product operation applied to the normalized extracted feature vectors. In some further embodiments, the distance metrics are rescaled and been to a selected integer range, such as, for example, eight bits.

At operation 640, a flow-semi-global matching (Flow-SGM) is performed on the 4D cost volume to estimate an optical flow vector for pixels of the first image. An estimated optical flow field may then be constructed by associating each optical flow vector with the corresponding image pixel.

Of course, in some embodiments, additional operations may be performed, as previously described in connection with the system. For example, occluded regions of the estimated optical flow field may be filled in using extrapolation techniques as described above. Additionally, the feature vector extraction may be performed by a trained convolutional neural network (CNN), the training based on training data that includes pairs of training images and associated ground truth optical flow vectors. The training may further employ a stochastic gradient descent operation performed on the training data.

In some further embodiments, the estimated optical flow vectors may be provided to a video segmentation application, a motion detection application, an object tracking application, an action recognition application, an autonomous driving system, or a computer vision application.

Example System

Figure 7:
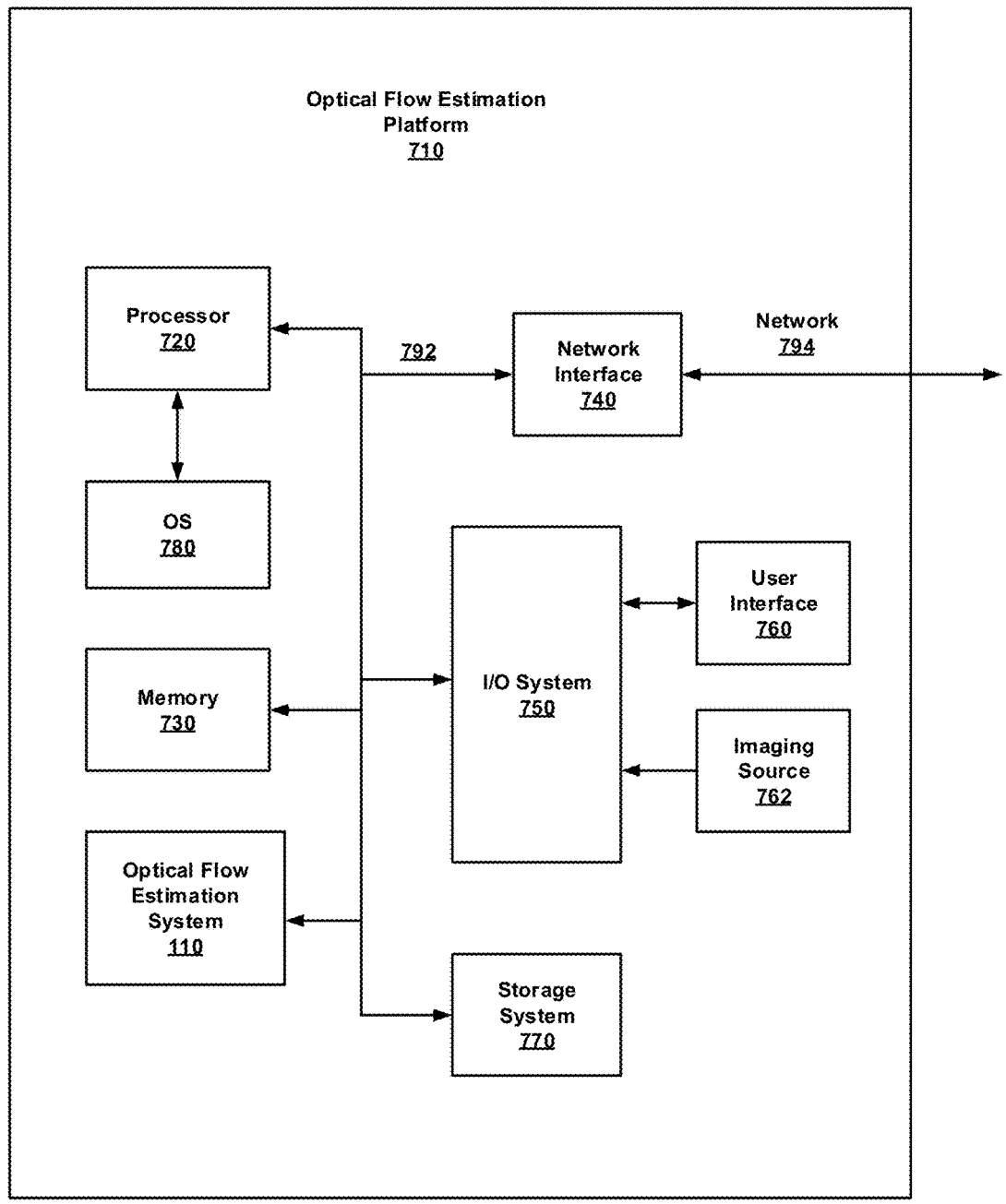
FIG. 7 is a block diagram schematically illustrating a platform to perform optical flow estimation, configured in accordance with certain embodiments of the present disclosure.

FIG. 7 illustrates an example system 700 to perform optical flow estimation, configured in accordance with certain embodiments of the present disclosure. In some embodiments, system 700 comprises an optical flow estimation platform 710 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, and so forth. Any combination of different devices may be used in certain embodiments.

In some embodiments, platform 710 may comprise any combination of a processor 720, a memory 730, optical flow estimation system 110, a network interface 740, an input/output (I/O) system 750, a user interface 760, an imaging source 762, and a storage system 770. As can be further seen, a bus and/or interconnect 792 is also provided to allow for communication between the various components listed above and/or other components not shown. Platform 710 can be coupled to a network 794 through network interface 740 to allow for communications with other computing devices, platforms, or resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor or a graphics processing unit to assist in control and processing operations associated with system 700. In some embodiments, the processor 720 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The processor(s) may be configured to provide parallel processing capability such that, for example, different portions of the disclosed algorithms can be executed simultaneously, and/or multiple segments of data can be processed simultaneously. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to, user interface 760, and an imaging source 762. User interface 760 may include devices (not shown) such as a display element, touchpad, keyboard, mouse, microphone, and speaker, etc. Imaging source 762 may be a camera, a video camera, a scanner, a database of images, or any other suitable source. I/O system 750 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 710.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Optical flow estimation system 110 is configured to provide the capability for optical flow estimation between a pair of images, using 4D cost volume processing, as described previously. Optical flow estimation system 110 may include any or all of the circuits/components illustrated in FIGS. 1,3, and 4, as described above. These components can be implemented or otherwise used in conjunction with a variety of suitable software and/or hardware that is coupled to or that otherwise forms a part of platform 710. These components can additionally or alternatively be implemented or otherwise used in conjunction with user I/O devices that are capable of providing information to, and receiving information and commands from, a user.

In some embodiments, these circuits may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the image replacement methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments, the functionalities disclosed herein can be incorporated into other software applications, such as image perception systems, robotics, and virtual reality applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for optical flow estimation. The method comprises: extracting, by a processor-based system, a first set of feature vectors from a first image, each feature vector of the first set associated with a pixel of the first image; extracting, by the processor-based system, a second set of feature vectors from a second image, each feature vector of the second set associated with a pixel of the second image; constructing, by the processor-based system, a 4-dimensional (4D) cost volume to store distance metrics between one or more feature vectors of the first set of feature vectors and one or more feature vectors of the second set of feature vectors; and performing, by the processor-based system, a flow-semi-global matching (Flow-SGM) on the 4D cost volume to estimate an optical flow vector for pixels of the first image.

Example 2 includes the subject matter of Example 1, further comprising normalizing the extracted feature vectors to unity length, and calculating the distance metric as a Euclidean distance using a vector dot product operation applied to the normalized extracted feature vectors.

Example 3 includes the subject matter of Examples 1 or 2, further comprising rescaling and binning the distance metrics of the 4D cost volume to a selected integer range.

Example 4 includes the subject matter of any of Examples 1-3, wherein the feature vector extraction is performed by a trained convolutional neural network (CNN), the training based on training data comprising pairs of training images and associated ground truth optical flow vectors.

Example 5 includes the subject matter of any of Examples 1-4, wherein the training further comprises performing a stochastic gradient descent operation on the training data.

Example 6 includes the subject matter of any of Examples 1-5, further comprising: down-sampling the first image and the second image, from an original resolution to a selected lower resolution; generating an estimated optical flow field comprising the estimated optical flow vectors; and up-sampling the estimated optical flow field to the original resolution using interpolation.

Example 7 includes the subject matter of any of Examples 1-6, further comprising post processing of the up-sampled estimated optical flow field to in-fill occluded regions, the in-filling based on extrapolation performed within homography fitted segments of the up-sampled estimated optical flow field.

Example 8 includes the subject matter of any of Examples 1-7, further comprising providing the estimated optical flow vectors to at least one of a video segmentation application, a motion detection application, an object tracking application, an action recognition application, an autonomous driving system, a computer navigation application, and a computer vision application.

Example 9 includes the subject matter of any of Examples 1-8, wherein the constructing comprises constructing a 4-dimensional (4D) cost volume to store a distance metric between each feature vector of the first set of feature vectors and a selected subset of feature vectors of the second set of feature vectors.

Example 10 is a system for optical flow estimation. The system comprises: a feature extraction circuit to extract a first set of feature vectors from a first image, each feature vector of the first set associated with a pixel of the first image; and to extract a second set of feature vectors from a second image, each feature vector of the second set associated with a pixel of the second image; a cost volume construction circuit to construct a 4-dimensional (4D) cost volume to store a distance metric between each feature vector of the first set of feature vectors and a selected subset of feature vectors of the second set of feature vectors; and a cost volume processing circuit to perform a flow-semi-global matching (Flow-SGM) on the 4D cost volume to estimate an optical flow vector for pixels of the first image and to generate an estimated optical flow field comprising the estimated optical flow vectors.

Example 11 includes the subject matter of Example 10, wherein the cost volume construction circuit is further to normalize the extracted feature vectors to unity length, and calculate the distance metric as a Euclidean distance using a vector dot product operation applied to the normalized extracted feature vectors.

Example 12 includes the subject matter of Examples 10 or 11, wherein the cost volume construction circuit is further to rescale and bin the distance metrics of the 4D cost volume to a selected integer range.

Example 13 includes the subject matter of any of Examples 10-12, wherein the feature extraction circuit further comprises a trained convolutional neural network (CNN) to extract the feature vectors, the training based on training data comprising pairs of training images and associated ground truth optical flow vectors.

Example 14 includes the subject matter of any of Examples 10-13, further comprising a training system to train the CNN based on application of a stochastic gradient descent to the training data.

Example 15 includes the subject matter of any of Examples 10-14, further comprising: an image down-sampling circuit to down-sample the first image and the second image, from an original resolution to a selected lower resolution; and an up-sampling circuit to up-sample the estimated optical flow field to the original resolution using interpolation.

Example 16 includes the subject matter of any of Examples 10-15, further comprising a post-processing circuit to in-fill occluded regions of the up-sampled estimated optical flow field, the in-filling based on extrapolation performed within homography fitted segments of the up-sampled estimated optical flow field.

Example 17 includes the subject matter of any of Examples 10-16, wherein the post-processing circuit is further to provide the estimated optical flow vectors to at least one of a video segmentation application, a motion detection application, an object tracking application, an action recognition application, an autonomous driving system, a computer navigation application, and a computer vision application.

Example 18 is at least one non-transitory computer readable storage medium having instructions encoded thereon that, when executed by one or more processors, result in the following operations for optical flow estimation. The operations comprise: extracting a first set of feature vectors from a first image, each feature vector of the first set associated with a pixel of the first image; extracting a second set of feature vectors from a second image, each feature vector of the second set associated with a pixel of the second image; constructing a 4-dimensional (4D) cost volume to store a distance metric between each feature vector of the first set of feature vectors and a selected subset of feature vectors of the second set of feature vectors; and performing a flow-semi-global matching (Flow-SGM) on the 4D cost volume to estimate an optical flow vector for pixels of the first image or the second image or both of the first image and second image.

Example 19 includes the subject matter of Example 18, further comprising the operations of normalizing the extracted feature vectors to unity length, and calculating the distance metric as a Euclidean distance using a vector dot product operation applied to the normalized extracted feature vectors.

Example 20 includes the subject matter of Examples 18 or 19, further comprising the operations of rescaling and binning the distance metrics of the 4D cost volume to a selected integer range.

Example 21 includes the subject matter of any of Examples 18-20, wherein the feature vector extraction is performed by a trained convolutional neural network (CNN), the training based on training data comprising pairs of training images and associated ground truth optical flow vectors.

Example 22 includes the subject matter of any of Examples 18-21, wherein the training further comprises the operation of performing a stochastic gradient descent on the training data.

Example 23 includes the subject matter of any of Examples 18-22, further comprising the operations of: down-sampling the first image and the second image, from an original resolution to a selected lower resolution; generating an estimated optical flow field comprising the estimated optical flow vectors; and up-sampling the estimated optical flow field to the original resolution using interpolation.

Example 24 includes the subject matter of any of Examples 18-23, further comprising the operation of post processing of the up-sampled estimated optical flow field to in-fill occluded regions, the in-filling based on extrapolation performed within homography fitted segments of the up-sampled estimated optical flow field.

Example 25 includes the subject matter of any of Examples 18-24, further comprising the operation of providing the estimated optical flow vectors to at least one of a video segmentation application, a motion detection application, an object tracking application, an action recognition application, an autonomous driving system, a computer navigation application, and a computer vision application.

Example 26 is a system for optical flow estimation. The system comprises: means for extracting a first set of feature vectors from a first image, each feature vector of the first set associated with a pixel of the first image; means for extracting a second set of feature vectors from a second image, each feature vector of the second set associated with a pixel of the second image; means for constructing a 4-dimensional (4D) cost volume to store distance metrics between one or more feature vectors of the first set of feature vectors and one or more feature vectors of the second set of feature vectors; and means for performing a flow-semi-global matching (Flow-SGM) on the 4D cost volume to estimate an optical flow vector for pixels of the first image.

Example 27 includes the subject matter of Example 26, further comprising means for normalizing the extracted feature vectors to unity length, and means for calculating the distance metric as a Euclidean distance using a vector dot product operation applied to the normalized extracted feature vectors.

Example 28 includes the subject matter of Examples 26 or 27, further comprising means for rescaling and binning the distance metrics of the 4D cost volume to a selected integer range.

Example 29 includes the subject matter of any of Examples 26-28, wherein the feature vector extraction is performed by a trained convolutional neural network (CNN), the training based on training data comprising pairs of training images and associated ground truth optical flow vectors.

Example 30 includes the subject matter of any of Examples 26-29, wherein the training further comprises means for performing a stochastic gradient descent operation on the training data.

Example 31 includes the subject matter of any of Examples 26-30, further comprising: means for down-sampling the first image and the second image, from an original resolution to a selected lower resolution; means for generating an estimated optical flow field comprising the estimated optical flow vectors; and means for up-sampling the estimated optical flow field to the original resolution using interpolation.

Example 32 includes the subject matter of any of Examples 26-31, further comprising means for post processing of the up-sampled estimated optical flow field to in-fill occluded regions, the in-filling based on extrapolation performed within homography fitted segments of the up-sampled estimated optical flow field.

Example 33 includes the subject matter of any of Examples 26-32, further comprising means for providing the estimated optical flow vectors to at least one of a video segmentation application, a motion detection application, an object tracking application, an action recognition application, an autonomous driving system, a computer navigation application, and a computer vision application.

Example 34 includes the subject matter of any of Examples 26-33, wherein the constructing comprises means for constructing a 4-dimensional (4D) cost volume to store a distance metric between each feature vector of the first set of feature vectors and a selected subset of feature vectors of the second set of feature vectors.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for optical flow estimation, the method comprising:
    extracting, by a processor-based system, a first set of feature vectors from a first image, each feature vector of the first set associated with a pixel of the first image;
    extracting, by the processor-based system, a second set of feature vectors from a second image, each feature vector of the second set associated with a pixel of the second image;
    constructing, by the processor-based system, a 4-dimensional (4D) cost volume to store distance metrics between one or more feature vectors of the first set of feature vectors and one or more feature vectors of the second set of feature vectors; and
    performing, by the processor-based system, a flow-semi-global matching (Flow-SGM) on the 4D cost volume to estimate an optical flow vector for pixels of the first image.

2. The method of claim 1, further comprising normalizing the extracted feature vectors to unity length, and calculating each of the distance metrics as a Euclidean distance using a vector dot product operation applied to the normalized extracted feature vectors.

3. The method of claim 1, further comprising rescaling and binning the distance metrics of the 4D cost volume to a selected integer range.

4. The method of claim 1, wherein the feature vector extraction is performed by a trained convolutional neural network (CNN), the training based on training data comprising pairs of training images and associated ground truth optical flow vectors.

5. The method of claim 4, wherein the training further comprises performing a stochastic gradient descent operation on the training data.

6. The method of claim 1, further comprising:
down-sampling the first image and the second image, from an original resolution to a selected lower resolution;
generating an estimated optical flow field comprising the estimated optical flow vector; and
up-sampling the estimated optical flow field to the original resolution using interpolation.

7. The method of claim 6, further comprising post processing of the up-sampled estimated optical flow field to in-fill occluded regions, the in-filling based on extrapolation performed within homography fitted segments of the up-sampled estimated optical flow field.

8. The method of claim 1, further comprising providing the estimated optical flow vector to at least one of a video segmentation application, a motion detection application, an object tracking application, an action recognition application, an autonomous driving system, a computer navigation application, and a computer vision application.

9. The method of claim 1, wherein the constructing comprises constructing a 4-dimensional (4D) cost volume to store a distance metric between each feature vector of the first set of feature vectors and a selected subset of feature vectors of the second set of feature vectors.

10. A system for optical flow estimation, the system comprising:
a feature extraction circuit to extract a first set of feature vectors from a first image, each feature vector of the first set associated with a pixel of the first image; and to extract a second set of feature vectors from a second image, each feature vector of the second set associated with a pixel of the second image;
a cost volume construction circuit to construct a 4-dimensional (4D) cost volume to store a distance metric between each feature vector of the first set of feature vectors and a selected subset of feature vectors of the second set of feature vectors; and
a cost volume processing circuit to perform a flow-semi-global matching (Flow-SGM) on the 4D cost volume to estimate an optical flow vector for pixels of the first image and to generate an estimated optical flow field comprising the estimated optical flow vector.

11. The system of claim 10, wherein the cost volume construction circuit is further to normalize the extracted feature vectors to unity length, and calculate the distance metric as a Euclidean distance using a vector dot product operation applied to the normalized extracted feature vectors.

12. The system of claim 10, wherein the cost volume construction circuit is further to rescale and bin the distance metrics of the 4D cost volume to a selected integer range.

13. The system of claim 10, wherein the feature extraction circuit further comprises a trained convolutional neural network (CNN) to extract the feature vectors, the training based on training data comprising pairs of training images and associated ground truth optical flow vectors.

14. The system of claim 13, further comprising a training system to train the CNN based on application of a stochastic gradient descent to the training data.

15. The system of claim 10, further comprising:
an image down-sampling circuit to down-sample the first image and the second image, from an original resolution to a selected lower resolution; and
an up-sampling circuit to up-sample the estimated optical flow field to the original resolution using interpolation.

16. The system of claim 15, further comprising a post-processing circuit to in-fill occluded regions of the up-sampled estimated optical flow field, the in-filling based on extrapolation performed within homography fitted segments of the up-sampled estimated optical flow field.

17. The system of claim 10, wherein the post-processing circuit is further to provide the estimated optical flow vector to at least one of a video segmentation application, a motion detection application, an object tracking application, an action recognition application, an autonomous driving system, a computer navigation application, and a computer vision application.

18. At least one non-transitory computer readable storage medium having instructions encoded thereon that, when executed by one or more processors, result in the following operations for optical flow estimation, the operations comprising:
extracting a first set of feature vectors from a first image, each feature vector of the first set associated with a pixel of the first image;
extracting a second set of feature vectors from a second image, each feature vector of the second set associated with a pixel of the second image;
constructing a 4-dimensional (4D) cost volume to store a distance metric between each feature vector of the first set of feature vectors and a selected subset of feature vectors of the second set of feature vectors; and
performing a flow-semi-global matching (Flow-SGM) on the 4D cost volume to estimate an optical flow vector for pixels of the first image or the second image or both of the first image and second image.

19. The computer readable storage medium of claim 18, further comprising the operations of normalizing the extracted feature vectors to unity length, and calculating the distance metric as a Euclidean distance using a vector dot product operation applied to the normalized extracted feature vectors.

20. The computer readable storage medium of claim 18, further comprising the operations of rescaling and binning the distance metrics of the 4D cost volume to a selected integer range.

21. The computer readable storage medium of claim 18, wherein the feature vector extraction is performed by a trained convolutional neural network (CNN), the training based on training data comprising pairs of training images and associated ground truth optical flow vectors.

22. The computer readable storage medium of claim 21, wherein the training further comprises the operation of performing a stochastic gradient descent on the training data.

23. The computer readable storage medium of claim 18, further comprising the operations of:
down-sampling the first image and the second image, from an original resolution to a selected lower resolution;
generating an estimated optical flow field comprising the estimated optical flow vector; and up-sampling the estimated optical flow field to the original resolution using interpolation.

24. The computer readable storage medium of claim 23, further comprising the operation of post processing of the up-sampled estimated optical flow field to in-fill occluded regions, the in-filling based on extrapolation performed within homography fitted segments of the up-sampled estimated optical flow field.

25. The computer readable storage medium of claim 18, further comprising the operation of providing the estimated optical flow vector to at least one of a video segmentation application, a motion detection application, an object tracking application, an action recognition application, an autonomous driving system, a computer navigation application, and a computer vision application.

* * * * *